Feb. 15, 1938.  A. SEYFARTH  2,108,272
COMBINED VALVE AND PRESSURE GAUGE
Filed Dec. 27, 1935
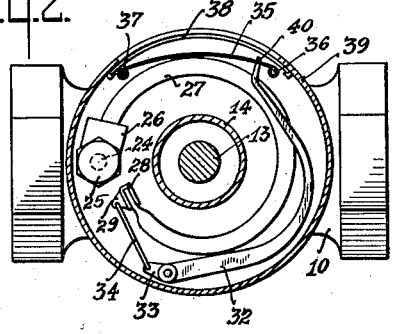
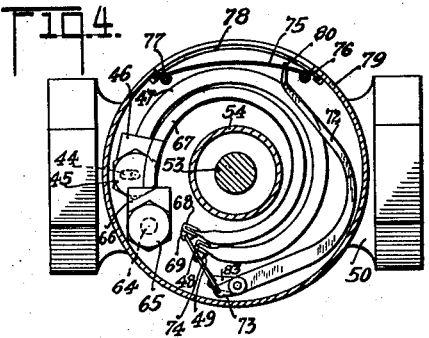
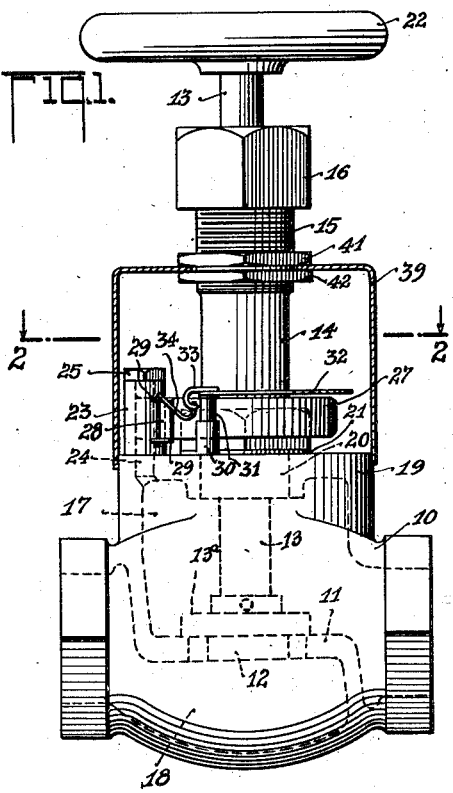
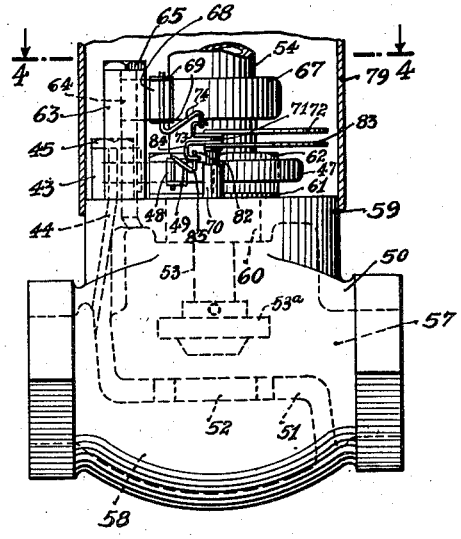
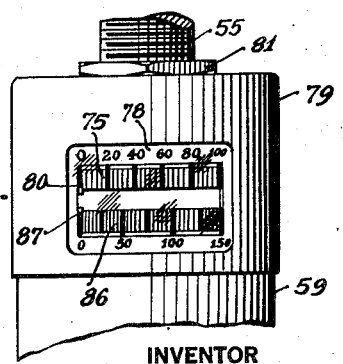
INVENTOR
ALFRED SEYFARTH
BY Van Deventer + Grier
ATTORNEYS.

Patented Feb. 15, 1938

2,108,272

UNITED STATES PATENT OFFICE 2,108,272

COMBINED VALVE AND PRESSURE GAUGE

Alfred Seyfarth, Altenburg, Germany, assignor to Charles L. Gulick and Siegfried Ruppricht, both of New York, N. Y.

Application December 27, 1935, Serial No. 56,323

8 Claims. (Cl. 73—109)

This invention relates to improvements in gauges and has for a principal object the provision of a gauge adapted to be built into a cooperating device, a portion of which may be embraced by a Bourdon or moving element of the gauge.

In gauges of the prior art, the space within the Bourdon is usually left empty. In this invention this empty or blank space is utilized thereby providing a very compact structure.

Although this invention may apply to various and sundry devices used in connection with systems under pressure or under vacuum, a simple embodiment is shown and described herein, and applied to a globe valve.

Referring to the drawing:

Figure 1 is a side elevation of a globe valve in combination with one embodiment of the invention;

Figure 2 is a plan view, partly in section, taken along the lines 2—2 in Figure 1;

Figure 3 is an elevation of a globe valve including another embodiment of the invention;

Figure 4 is a plan view, partly in section, taken along the line 4—4 of Figure 3; and Figure 5 is an elevation, partly broken away, taken from the opposite side of Figure 3.

The valve, Figure 1, consists of the usual globe body 10 having a partition 11 formed therein. This partition has formed therein an opening 12 upon which the valve seats. As the valve per se may be of any well known type, it is not herein shown and described. However, it is carried by the valve stem 13 and may be raised or lowered to open or close, respectively, the opening 12.

The valve stem 13 is threaded and cooperates with threads (not shown) in the bushing 14. The upper end of this bushing is provided with external threads 15 and a packing nut 16 is internally threaded to match the threads 15 and carries the usual stuffing box (not shown). The lower end of the valve stem 13 may be provided with a suitable valve 13a.

The partition 11 divides the interior of the globe body 10 into chambers 17 and 18, which communicate with each other via the opening 12 when the valve 13a is open.

The globe body is provided with a circular boss 19 which forms a support for the elements of the gauge. The bushing 14 has its lower portion 20 threaded into the center of the boss 19, the usual sealing washer 21 being provided therebetween to effect a seal. The upper end of the stem 13 may be provided with the usual hand wheel 22.

A stud 23 extends upwardly from the surface of the boss 19 and has a hole 24 formed therein communicating with the chamber 17. The upper end of the stud 23 may be provided with a sealing cap 25.

The stud 23 is provided with an extension 26, Figure 2, which in turn has one end of the Bourdon 27 embedded therein in such a manner that the interior of the Bourdon communicates with the chamber 17 via the hole 24. The other end of the Bourdon is sealed up and capped with a clamp 28 having a pair of lugs 29 extending therefrom.

A stud shaft 30 has pivoted thereto a bushing 31 carrying an indicator arm 32 and a link member 33. The bushing 31, the arm 32 and the link member 33 are in fixed relation to each other and move bodily together. A link 34 has one end thereof connected to the link member 33 and the other end connected to the pair of lugs 29.

A graduated scale plate 35 is supported on upright pins 36 and 37 carried by the boss 19 adjacent to a transparent window 38 formed in the housing 39. The indicator arm 32 has an upturned portion 40 which forms a pointer cooperating with the scale plate 35.

The housing 39 is in the form of a cup, the open end of which fits the boss 19. The closed end of the cup has a hole formed therein which clears the threaded portion 15 of the bushing, and nuts 41 and 42 on the threads 15 may be adjusted to limit the depth of the cup shaped member on the boss and to seal the same against dust, dirt, etc.

When a gauge and valve combination, such as is described, is applied to a pressure or vacuum system, the amount of pressure, or vacuum, on the portion of the system in communication with the chamber 17, is immediately in front of the valve operator so that there is no question as to what the pressure, or vacuum, is. This is particularly valuable in places where space is at a premium as this device does not take up any more room than a globe valve alone and further, no external fittings are necessary as would be the case were an ordinary gauge applied to a system.

In the embodiment shown in Figures 3, 4 and 5, two readings may be taken at the same time. The globe body 50 is provided with a partition or dividing wall 51 having an opening 52 formed therein against which the valve member 53a may seat. The valve is carried by a stem 53 which is in turn mounted in a bushing 54.

The upper end of the bushing is provided with a threaded portion 55, the upper end of which is provided with a packing nut similar to that indicated by the numeral 16, in Figure 1. The partition 51 divides the interior of the globe body 50 into two chambers designated by the numerals 57 and 58. The globe body is provided with a boss 59 which forms a support for the gauge member, presently to be described.

The lower end 60 of the bushing 54 is threaded into the center of the boss 59. A suitable sealing washer 61 is provided between the shouldered portion 62 of the bushing and the boss.

A stud 63 has a hole 64 formed therein communicating with the chamber 57. The upper end of the stud 63 is provided with a suitable sealing cap 65. The stud 63 is provided with an extension 66 which in turn has one end of the Bourdon 67 embedded therein in such a manner that the interior of the Bourdon communicates with the chamber 57 via the hole 64. The other end of the Bourdon is sealed up and capped with a clamp 68 having a pair of lugs 69 extending therefrom.

The upper surface of the boss 59 is provided with a second stud 43 which has formed therein, and in a portion of the body, a hole 44 which communicates with the chamber 58. The upper end of the stud 43 is provided with a suitable sealing cap 45.

The stud 43 has an extension 46 formed integral therewith which in turn has one end of the Bourdon 47 embedded therein in such a manner that the interior of the Bourdon communicates with the chamber 58 via the hole 44. The other end of the Bourdon is sealed up and capped with a clamp 48 having a pair of lugs 49 extending therefrom.

A stud shaft 70 has pivoted thereto a bushing 71 carrying an indicator arm 72 and a link member 73. The bushing 71, the arm 72 and the link member 73 are in fixed relation to each other and move bodily together. A link 74 has one end thereof connected to the link member 73 and the other end connected to the pair of lugs 69.

A graduated scale plate 75 is supported on upright pins 76 and 77 carried by the boss 59 adjacent to a transparent window 78 formed in the housing 79. The indicator arm 72 has an upturned portion 80 which forms a pointer cooperating with the scale plate 75. The housing 79 is in the form of a cup, the open end of which fits the boss 59. The closed end of the cup has a hole formed therein which clears the threaded portion 55 of the bushing, and nuts, one of which is designated by the numeral 81, on the threads 55 are provided for sealing the cup shaped member in dust tight relation with the boss 59.

The stud shaft 70 also carries a bushing 82 which has riveted thereto an indicator arm 83 and a link member 84. A link 85 connects the link member 84 to the lugs 49.

The pins 76 and 77 also support a second scale plate 86, which is preferably spaced apart from scale plate 75, and the arm 83 has a downwardly projecting tip 87 which passes over the surface of the scale plate 86 and serves as a pointer.

By this arrangement two separate and distinct gauge devices are supported upon, and indicate the pressure in the chambers 57 and 58 of the valve. They do not occupy any more space than an ordinary valve of the same size and character.

If the end of the valve communicating with the chamber 57 is connected to a source of high pressure, for example, and it is desired to maintain a lower pressure in a system connected to the end of the valve communicating with the chamber 58, the valve may be adjusted, while the operator watches the movement of the pointer 87 over the scale plate 86, to maintain the desired pressure in said system, the pointer 80 moving over the scale plate 75 at the same time indicating the pressure on the high pressure source.

In one of the embodiments described, two distinct pressures are maintained and the arrangement of the gauges in accordance with the invention enables an operator to see both scale plates adjacent and parallel to each other without having to have his attention divided between, as has been customary heretofore, a gauge in one position and a second gauge spaced apart from the first gauge, and in many instances requiring that the operator completely turn his head.

The new arrangements herein shown offer another advantage in that a minimum number of connections is employed in installing such devices with the elimination of extra fittings.

While the invention is shown and described in simple embodiments in connection with a globe valve in which a portion thereof extends through and is embraced by the elements of the gauge, it is obvious that such elements may be applied to other devices in a similar manner and that many changes may be made in the device shown and described without departing from the spirit of the invention as set forth in the following claims.

What is claimed is:

1. In combination, a gauge, a body comprising a support for the parts of said gauge, means forming a plurality of chambers in said body, means forming a valve seat between said chambers, passages communicating with said chambers, a valve within one of said chambers in cooperative relation with said seat, a member for adjusting said valve extending from said body in angular relation to at least one of said passages, a "Bourdon" element carried on said support and embracing said member, a duct connecting the interior of said element with at least one of said chambers, a pointer pivotally supported on said body and operatively connected to said element, and a graduated scale positioned on the said body in cooperative relation to said pointer.

2. In combination, a gauge, a member having a plurality of cavities formed therein and having a surface forming a support for the members of said gauge, a boss formed integral with and extending from said surface, means forming a gate between said cavities, a closure device mounted within said member and having an adjusting shaft extending through said boss, passages leading out of said member from said cavities, said passages being angular in respect to said boss and the shaft passing therethrough, a "Bourdon" element supported on said surface and embracing said boss, a duct connecting the interior of said element to at least one of said cavities, an arcuate scale plate supported in fixed relation to said surface, a pointer pivotally mounted on said surface in cooperative relation to said plate, a cup-shaped casing forming with said member and said boss an enclosure for the parts of said gauge, and means forming an arcuate transparent window in said casing adjacent to said plate.

3. In a gauge, a valve member having a plurality of chambers under pressure or vacuum, one surface of said member adapted to support elements of said gauge, a Bourdon element carried on said support and having its interior communicating with one of said chambers, a second Bourdon element carried on said support and having its interior communicating with the other of said chambers, a control member of said valve extending through and embraced by said Bourdon elements, a pair of curved scale plates positioned on said member and a pointer for and associated with each of said elements, each being adapted to cooperate with one of said scale plates.

4. In a gauge, a member having a plurality of chambers under pressure or vacuum, one surface of said member forming a support for the parts of said gauge, a boss extending from said surface and forming an integral part of said member, means forming a valve seat between said chambers, a valve in cooperative relation to said seat, a valve stem operatively supported in said boss, a "Bourdon" element carried on said support and having its interior communicating with one of said chambers, a second "Bourdon" element carried on said support and having its interior communicating with the other of said chambers, said "Bourdon" elements almost completely surrounding said boss, a pair of graduated scale plates supported in the same plane and spaced apart from each other, a pointer for each scale plate adapted to move in the space between said indicators, and means operatively connecting one of said pointers to one of said elements and the other pointer to the other of said elements.

5. In a gauge, a valve device having a plurality of pressure chambers formed therein, a portion of said device comprising a support for elements of said gauge, and an operative member of said valve extending from said support, a Bourdon element carried on said support about said member and having its interior communicating with one of said chambers, a second Bourdon element carried on said support about said member and having its interior communicating with the other of said chambers, a pivot shaft carried on said support, a pair of indicator arms pivotally supported on said shaft, a graduated scale plate positioned on said member in cooperative relation to one of said arms and a second graduated scale plate spaced apart from said first scale plate and positioned in cooperative relation to said second arm, a link member connecting said first Bourdon element to one of said arms, a link member connecting said second Bourdon to the other of said arms, and an enclosure for said gauge formed in part by said support, said enclosure having a window formed therein through which said indicator arms and said scale plates are visible.

6. A combined gauge and valve comprising a valve body having a plurality of chambers formed therein, a flat surface integral with said body and forming a support for the elements of said gauge, a control member for said valve extending from said surface, a "Bourdon" element maintained on said support spanning said control member and having its interior communicating with one of said chambers, a second "Bourdon" element mounted on said support spaced apart from said first element, spanning said control member and having its interior communicating with the other of said chambers, graduated scales having needles controlled by said elements and positioned in side by side relation to each other and visible to an operator while operating said control member, and a closure member forming with said support and said control member a dust-proof casing for the elements of said gauge, said enclosure having a window formed therein through which said indicator arms and said scale plates are visible.

7. A combined gauge and pressure regulating valve comprising a valve body having a plurality of chambers formed therein, a flat surface integral with said body and forming a support for the elements of said gauge, a column extending from said surface, an active adjusting element for said valve having a portion of its length embraced by said column, a "Bourdon" element maintained on said support and having its interior communicating with one of said chambers, a second "Bourdon" element mounted on said support and spaced apart from said first element and having its interior communicating with the other of said chambers, said "Bourdon" elements spanning said column, graduated scale plates positioned in side by side relation to each other, a pivotally mounted pointer for each of said scales, each pointer being controlled by one of said "Bourdon" elements, and means enclosing the elements of said gauge and comprised in part of an annular closure member having a window through which said pointers and scale plates are visible.

8. The invention according to claim 7 in which the radii of the pointers and the radius of the scale plates are substantially longer than the radius of the annular closure member, thereby making the scale plates approach a flat form and rendering said pointers capable of greater swing, permitting readings to be made with greater accuracy.

ALFRED SEYFARTH.